(12) United States Patent
Yamanaka

(10) Patent No.: US 6,912,186 B2
(45) Date of Patent: Jun. 28, 2005

(54) DATA RECORDING/REPRODUCING METHOD FOR OPTICAL DISK AND APPARATUS FOR THE SAME

(75) Inventor: Yutaka Yamanaka, Tokyo (JP)

(73) Assignee: NEC Corporation (JP)

( * ) Notice: Subject to any disclaimer, the term of this patent is extended or adjusted under 35 U.S.C. 154(b) by 602 days.

(21) Appl. No.: 10/112,110

(22) Filed: Mar. 26, 2002

(65) Prior Publication Data

US 2002/0141305 A1 Oct. 3, 2002

(30) Foreign Application Priority Data

Mar. 28, 2001 (JP) ........................................ 2001/092431

(51) Int. Cl.$^7$ ................................................ G11B 7/00
(52) U.S. Cl. .............................. 369/47.27; 369/124.02; 369/124.03
(58) Field of Search ............................ 369/275.3, 275.4, 369/44.26, 44.37, 47.23, 47.24, 47.27, 47.28, 47.31, 53.25, 53.31, 124.02, 124.03, 124.07, 124.11, 124.12

(56) References Cited

U.S. PATENT DOCUMENTS 6,044,051 A * 3/2000 Miyagawa et al. ...... 369/47.19
6,118,752 A * 9/2000 Miyagawa et al. ...... 369/275.3
6,538,963 B1 * 3/2003 Fukada ..................... 369/47.27
6,800,348 B2 * 10/2004 Takemoto et al. ....... 369/275.3

FOREIGN PATENT DOCUMENTS

| JP | 6-333240 | 12/1994 |
|---|---|---|
| JP | 9-54978 | 2/1997 |
| JP | 2000-57580 | 2/2000 |
| JP | 2000-268368 | 9/2000 |

\* cited by examiner

Primary Examiner—Thang V. Tran
Assistant Examiner—Bach Vuong
(74) Attorney, Agent, or Firm—Hayes Soloway P.C.

(57) ABSTRACT

In a method of recording or reproducing data out of an optical disk of the present invention, the optical disk is includes a substrate formed with a spiral groove track and a land track formed between nearby portions of the groove track. Header information is periodically recorded in each of the groove track and land track. Beam spots are formed on the land track and groove at the same time. Data are recorded in or reproduced out of the land track and groove track at the same time on the basis of a timing determined by the header information read out of the land track and groove track. When one beam spot formed on either one of the land track and groove track is reading the header information, the other beam spot is inhibited from recording or reproducing data.

12 Claims, 6 Drawing Sheets

DATA RECORDING/REPRODUCING METHOD FOR OPTICAL DISK AND APPARATUS FOR THE SAME

BACKGROUND OF THE INVENTION

1. Field of the Invention

The present invention relates to a method of recording or reproducing data in or out of a land-and-groove type optical disk with a plurality of beam spots.

2. Description of the Background Art

To increase the track density of an optical disk, there has been proposed a format in which a tracking groove formed in the disk and a land formed between nearby portions of the tracking groove both are used as data tracks. In a land-and-groove type recording medium with such a format, crosstalk between the land and the groove adjoining each other can be reduced if the groove is provided with adequate depth, compared to data tracks arranged side by side in the same plane. This type of recording medium therefore readily implements narrow tracks.

However, the land-and-groove type recording medium has some problems left unsolved, as will be described specifically later.

Technologies relating to the present invention are disclosed in, e.g., Japanese Patent Laid-Open Publication Nos. 6-333240, 9-54978, 2000-57580 and 2000-268368.

SUMMARY OF THE INVENTION

It is an object of the present invention to provide a method capable of recording or reproducing data in or out of the groove track and land track of an optical disk at the same time with a simple configuration, and an apparatus for practicing the same.

In a method of recording or reproducing data out of an optical disk of the present invention, the optical disk is includes a substrate formed with a spiral groove track and a land track formed between nearby portions of the groove track. Header information is periodically recorded in each of the groove track and land track. Beam spots are formed on the land track and groove at the same time. Data are recorded in or reproduced out of the land track and groove track at the same time on the basis of a timing determined by the header information read out of the land track and groove track. When one beam spot formed on either one of the land track and groove track is reading the header information, the other beam spot is inhibited from recording or reproducing data.

An apparatus for practicing the above method is also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
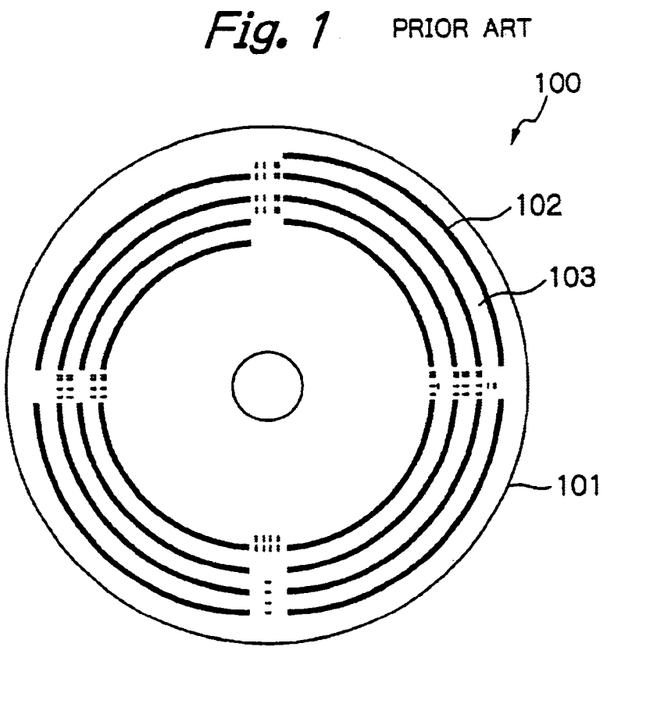
FIG. 1 is a plan view showing an optical disk for use in a conventional recording/reproducing apparatus.

To better understand the present invention, brief reference will be made to an optical disk to which a conventional recording/reproducing apparatus is applied. As shown, the optical disk, generally 100, has a substrate 101 formed with a spiral groove track 102. Nearby portions of the groove track 102 form a spiral land track 103 therebetween. The groove track 102 and land track 103 therefore form a double-spiral structure an the disk 100.

Assume that a single beam spot from an optical head is used to record or reproduce data in or out of the groove track 102 and land track 103. Then, the beam spot must jump from one of the groove track 102 and land track 103 to the other for thereby tracking both of the tracks 102 and 103. As a result, servo control over the optical head is necessary for the track jump. The servo control, however, not only complicates a servo mechanism associated with the optical head, but also increases the probability of servo error at the time of track jump.

In light of the above, a multibeam optical head capable of forming a plurality of beam spots on the optical disk 100 may be used in order to assign one beam spot to each of the groove track 102 and land track 103. The multibeam optical head can form beam spots on the groove track 102 and land track 103 at the same time for recording or reproducing data. This kind of head does not need the track jump and therefore achieves stable servo control.

However, the problem with the multibeam optical head is that signals derived from the two beam spots cannot be distinguished from each other unless interference between the beam spots is fully obviated. To obviate the interference, the distance between the beam spots must be increased relative to the track pitch of the disk 100. More specifically, as shown in FIG. 2, beam spots L1 and L2 assigned to the groove track 102 and land track 103, respectively, must be shifted in position from each other in the direction of track.

Figure 2:
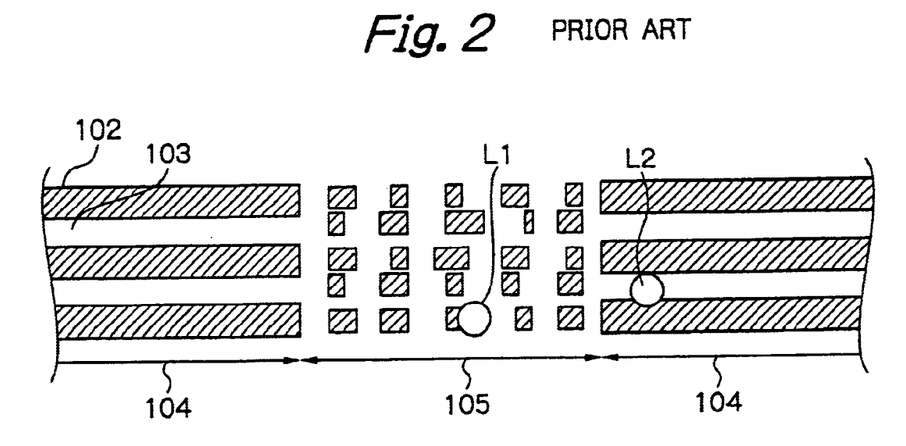
FIG. 2 is a fragmentary enlarged view showing a relation between tracks and beam spots formed on the disk of FIG. 1.

In FIG. 2, the optical disk 100 is shown as having data sectors 104 including header information 105 each. It sometimes occurs that when one beam spot, e.g., the beam spot L1 is reproducing the header information 105, the other bean spot L2 accesses the data sector 104 for recording or reproducing data. The operation of the recording/reproducing apparatus and the purpose of use of reproduced information differ from the reproduction of the header information 105 to the recording/reproduction of data. Therefore, if the recording/reproducing apparatus reproduces the header information 105 and records or reproduces data at the same time, then sophisticated control over the apparatus is necessary. Such sophisticated control results in sophisticated construction and high cost. Moreover, the reproduction of the header information 105 and the recording/reproduction of data do not coincide in timing between a plurality of tracks.

Figure 3:
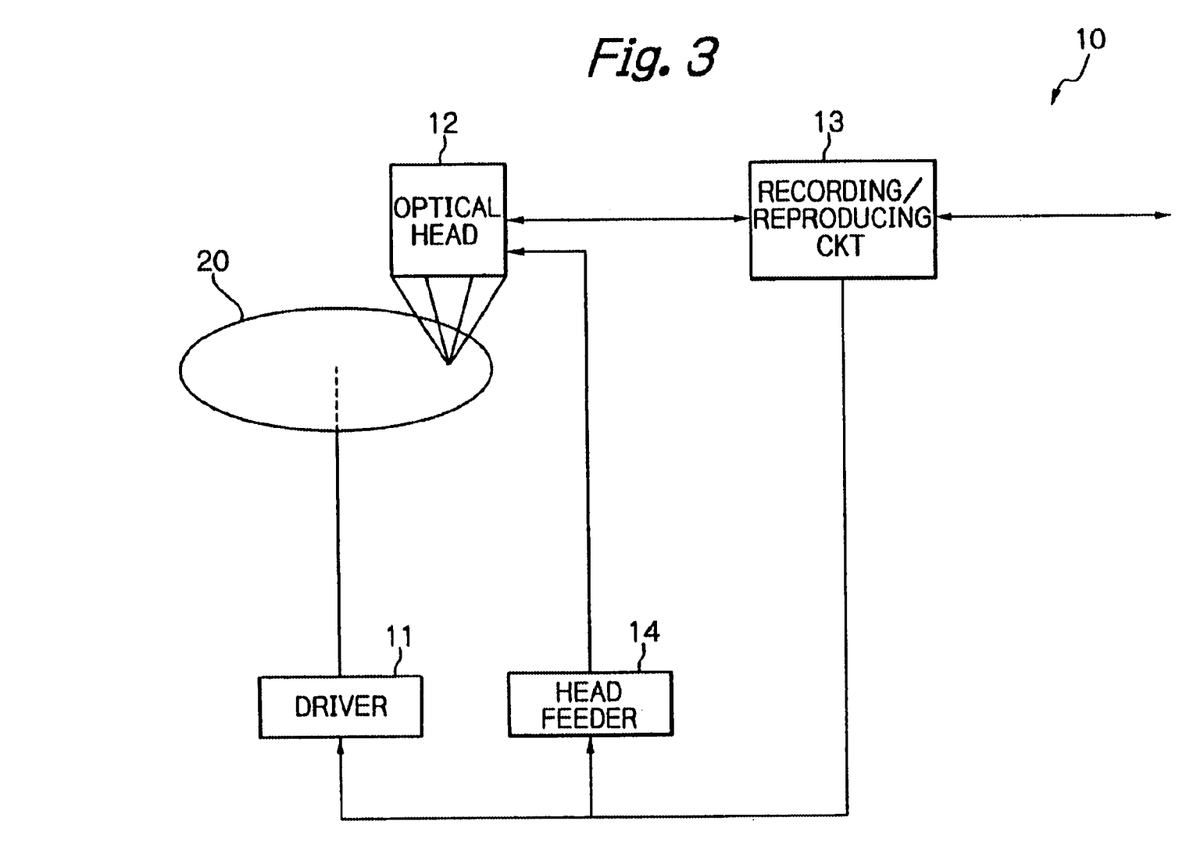
FIG. 3 is a block diagram schematically showing a recording/reproducing apparatus embodying the present invention.

Referring to FIG. 3, a recording/reproducing apparatus 10 embodying the present invention will be described. As shown, the recording/reproducing apparatus, generally 10, includes a driver 11, an optical head 12, a recording/reproducing circuit 13, and a head feeder 14.

The driver 11 causes an optical disk 20 to spin at a preselected speed and is implemented by a spindle motor by way of example. The optical head (simply head hereinafter) 12 emits light toward the recording surface of the disk 20 while sensing the resulting reflection from the recording surface. Having a multibeam configuration, the head 12 forms one beam spot on each of a land track and a groove track, which will be described later, while sensing the resulting reflection. The head 12 reads header information out of the disk 20 and records or reproduces data in or out of the data sectors of the disk 20.

The recording/reproducing circuit 13 reproduces information recorded in the disk 20 on the basis of the output signal of the head 12. At the same time, the recording/reproducing circuit 13 drives the head 12 in accordance with a signal to be recorded in the disk 20, so that the head 12 emits an optical signal toward the disk 20. The head feeder 14 feeds the head 12 to a preselected track position on the disk 20 in accordance with the output signal of the recording/reproducing circuit 13. Further, the driver 11 causes, based on the output signal of the recording/reproducing circuit 13, the disk 20 to spin at a constant linear velocity in accordance with the position of the head 12 in the radial direction of the disk 20.

Figure 4:
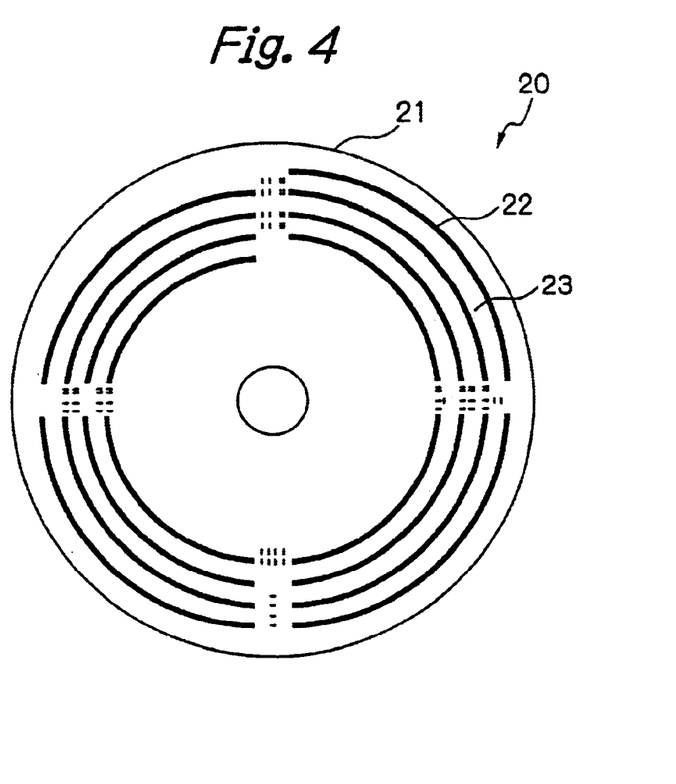
FIG. 4 is a plan view showing an optical disk for use in the illustrative embodiment.

As shown in FIG. 4, a spiral groove track 22 is formed in the disk 20 over substantially the entire surface of a substrate 21. Nearby portions of the groove track 22 form a spiral land track 23 therebetween. The groove track 22 and land track 23 therefore form a double-spiral structure on the disk 20.

Figure 5:
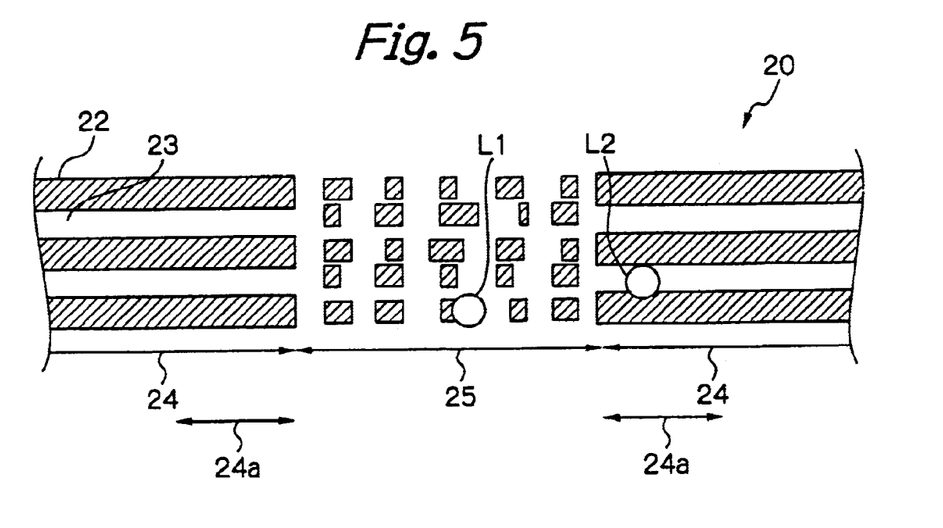
FIG. 5 is a fragmentary enlarged view showing a relation between tracks and beam spots formed in the disk of the illustrative embodiment.

As shown in FIG. 5, header information 25 are periodically recorded in the disk 20 independently of data sectors 24. Each header information 25 shows, e.g., the address of associated one of the data sectors 24. The header information 25 is recorded in the disk 20 in the form of pits formed by embossing. If desired, the pits representative of the header information 25 may be positioned at the border between the groove track 22 and the land track 23 and shared by both of the tracks 22 and 23.

As shown in FIG. 5, the head 12 forms beam spots L1 and L2 on the groove track 22 and land track 23, respectively. The beam spots L1 and L2 are shifted in position from each other in the direction of track. This is because the distance between the beam spots L1 and L2 available with the head 12 is generally greater than the distance between the tracks of the disk 20. For example, while the state-of-the-art DVD (Digital Versatile Disk) has a track pitch of about 0.7 $\mu$m, a spot distance available with a multibeam optical head is as great as 10 $\mu$m.

In the illustrative embodiment, the disk 20 additionally includes blank regions 24a storing no data and each forming the end portion of a particular data section 24 that adjoins header information 25. Each blank region 24a has a length greater than the distance between the bean spots L1 and L2 in the direction of track. As shown in FIG. 5, the blank region 24a may be positioned in the range where grooves are formed, a mirror surface where grooves are absent or even in the range where dummy embossed pits, which are not used as header information, are present, In operation, the driver 11 causes the disk 20 to spin at the preselected speed. The head 12 records signals in the disk 20 or reproduces signals out of the disk 20 in accordance with the output signal of the recording/reproducing circuit 13. At this instant, the head feeder 14 moves the head 12 relative to the disk 20 in accordance with. e.g., address information relating to the head 12, insuring accurate recording or reproduction.

The head 12 forms the beam spots L1 and L2 on the groove track 22 and land track 23, respectively. In this condition, the head 12 reproduces the header information 25 recorded in the groove track 22 and land track 23 at the same time. Further, the head 12 records or reproduces data in or out of the data portions 24 of the tracks 22 and 23.

More specifically, as shown in FIG. 5, when one beam spot. e.g., the beam spot L1 is reproducing the header information 25, the other beam spot L2 is positioned in the blank region 24a of the data portion 24. The beam spot L2 therefore does not record or reproduce data in or out of the data sector 24. In this manner, the head 12 does not record or reproduce data in or out of the data sector 24 at the same time as it reproduces the header information 25. The recording/reproducing device 10 therefore does not need sophisticated control and is therefore simple and low cost.

Figure 6:
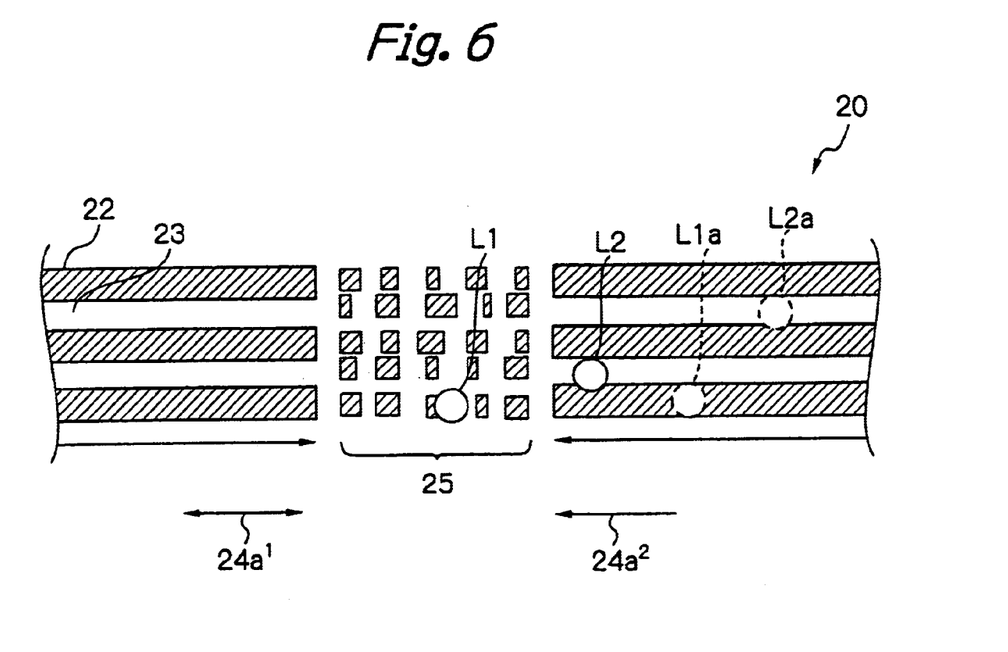
FIG. 6 is a fragmentary enlarged view showing a modification of the illustrative embodiment.

In the illustrative embodiment, the blank region 24a is included in each of the groove track 22 and land track 23 at both sides of the header information 25 in the right-and-left direction, as viewed in FIG. 5. On the other hand, as shown in FIG. 6, assume that the left beam spot L1 and right beam spot L2 are exclusively assigned to the groove track 22 and land track 23, respectively. Then, a left blank region 24a1 and a right blank region 24a2 are formed only in the groove track 22 and land track 23, respectively. This successfully reduces the size of the blank region 24a in each of the groove track 22 and land track 23, allowing greater capacity to be allotted to data.

In the illustrative embodiment, the beam spots L1 and L2 are formed on the portions of the groove track 22 and land track 23 adjoining each other. Alternatively, as shown in FIG. 6, the head 12 may form beam spots L1a and L2a (phantom circles) on the portions of the groove track 22 and land track 23 remote from each other.

In the case where the distance between the beam spots L1 and L2 (or L1a and L2a) is fixed with respect to the disk 20, the distance between the beam spots L1 and L2 in the direction of track is fixed. It follows that data can be recorded in or reproduced from the data sector 24 of the groove track 22 and land track 24 on the basis of a timing determined only by the header information 25 read out of the groove track 22 or the land track 23 by only either one of the beam spots L1 and L2.

More specifically, when the header information 25 of the groove track 22 is used for the above purpose alone, the blank region 24a should only be formed on the land track 23. Conversely, when the header information 25 of the land track 23 is used alone, the blank region 24a should only be formed on the groove track 22. This further increases the capacity to be allotted to data. Further, there can be omitted the header information 25 not used, i.e., the header information of the land track 23 or that of the groove track 23 in which the blank region 24a is formed.

Figure 7:
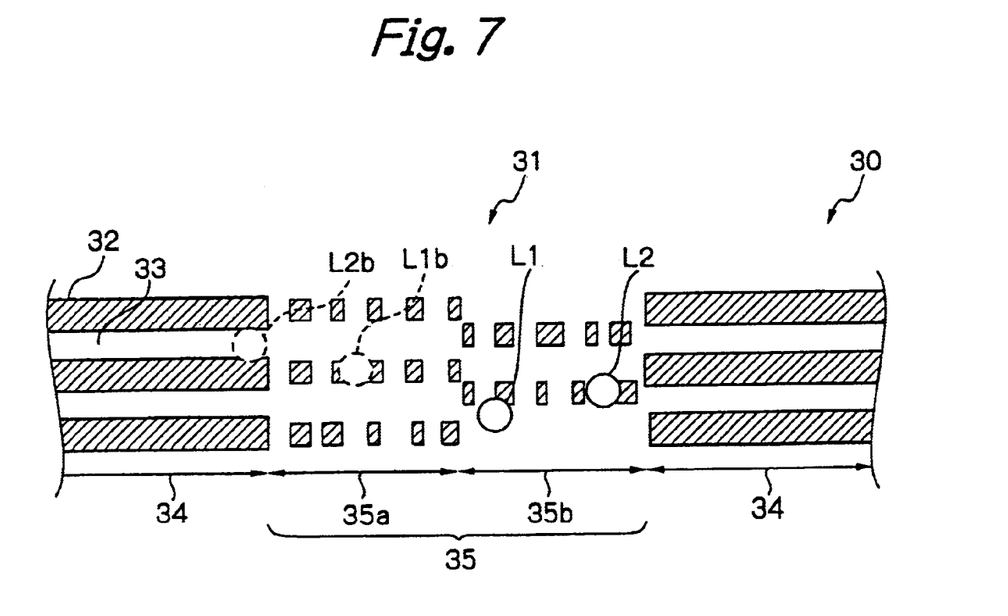
FIG. 7 is a fragmentary enlarged view showing an alternative embodiment of the present invention.

FIG. 7 shows an optical disk 30 representative of an alternative embodiment of the present invention. As for the rest of the construction, this embodiment is identical with the previous embodiment. As shown, the optical disk 30 has a substrate 31 formed with a groove track 32 and a land track 33. Header information 35 is recorded in the disk 30 between data sectors 34. In the illustrative embodiment, header information 35 is recorded only in the groove track 32 in the left part of FIG. 7 while header information 35b is recorded only in the land track 33 in the right part of FIG. 7. The optical head, not shown, forms the beam spots L1 and L2 at positions spaced in the direction of track by a distance corresponding to the distance between the header information 35a and 35b in the above direction.

In the illustrative embodiment, the beam spot L1 reproduces the header information 35a out of the groove track 32. Likewise, the beam spot L2 reproduces the header information 35b out of the land track 33. Therefore, the distance between the header information 35a of the groove track 32 and the header information 35b of the land track 33 can be increased in the direction of track when the track pitch is too small to form the pits or when crosstalk between the nearby portions of the tracks 32 and 33 is noticeable during reproduction. With this configuration, the illustrative embodiment not only allows the pits to be easily formed by embossing, but also reduces the influence of crosstalk during reproduction.

The header information 35a and 35b each have a length greater than the distance between the beam spots L1 and L2. Therefore, when one beam spot L1 or L2 reproduces the header information 35a or 35b, respectively, the other beam spot L2 or L1 does not access the data portion 34, i.e., does not record or reproduce data.

Further, assume that the distance between the beam spots L1 and L2 in the direction of track is substantially equal to the distance between the header information 35a and 35b in the above direction. Then, the beam spots L1 and L2 can reproduce the header information 35a and 35b substantially at the same time. The recording/reproducing device can therefore easily deal with the header information 35a and 35b.

In FIG. 7, phantom circles indicate beam spots L1b and L2b shifted from each other in the opposite relation to the header information 35a and 35b. In this case, the disk 30 needs blank regions like the disk 20 shown in FIGS. 5 and 6.

Figure 8:
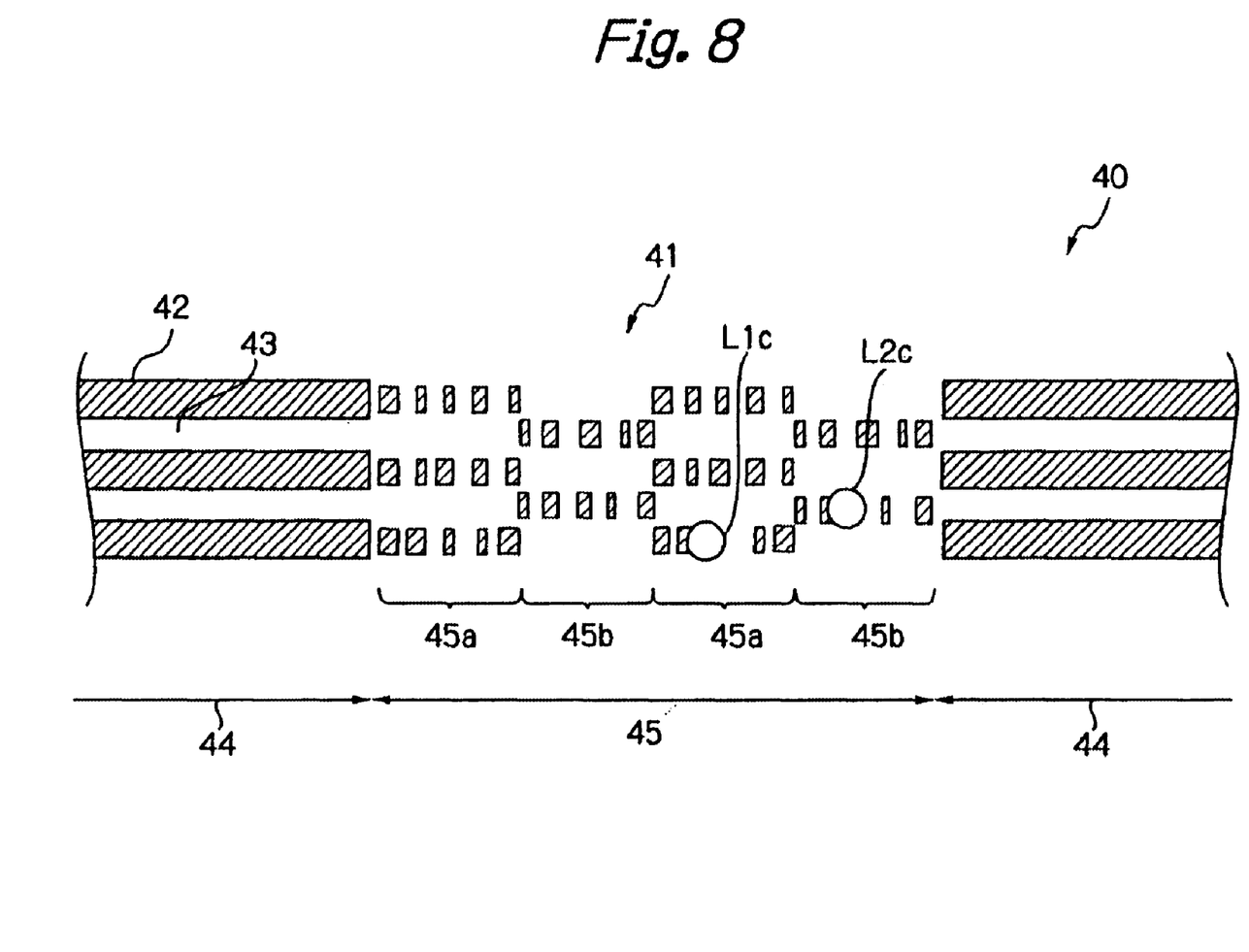
FIG. 8 is a fragmentary enlarged view showing another alternative embodiment of the present invention.

FIG. 8 shows an optical disk 40 representative of another alternative embodiment of the present invention. As for the rest of the construction, this embodiment is also identical with the embodiment described with reference to FIG. 3. As shown, the optical disk 40 has a substrate 41 formed with a groove track 42 and a land track 43. Header information 45 is recorded in the disk 40 between data sectors 44. In the illustrative embodiment, header information 45a recorded only in the groove track 32 and header information 45b recorded only in the land track 33 each are divided into a plurality of segments (two segments in the illustrative embodiment). The optical head, not shown, form beam spots L1c and L2c at positions spaced in the direction of track by a distance corresponding to the distance between the segments of the header information 45a or 45b in the above direction.

In the illustrative embodiment, the beam spot L1c reproduces the header information 45a out of the groove track 42 while the beam spot L2c reproduces the header information out of the land track 43. More specifically, assume that the header information 45 has a length greater than the distance between the beam spots L1c and L2c. Then, the header information 45 are divided into segments alternating with each other in the direction of track, so that the beam spots L1c and L2c can reproduce the header information 45 even if the distance between the beam spots L1c and L2c is small.

In the illustrative embodiment the distance between the beam spots L1c and L2c does not have to be matched to the length of the header information 45. This makes it needless to increase the aperture of an object lens, not shown, included in the head. It follows that the beam spots L1c and L2c can be desirably converged on the disk 41.

Figure 9:
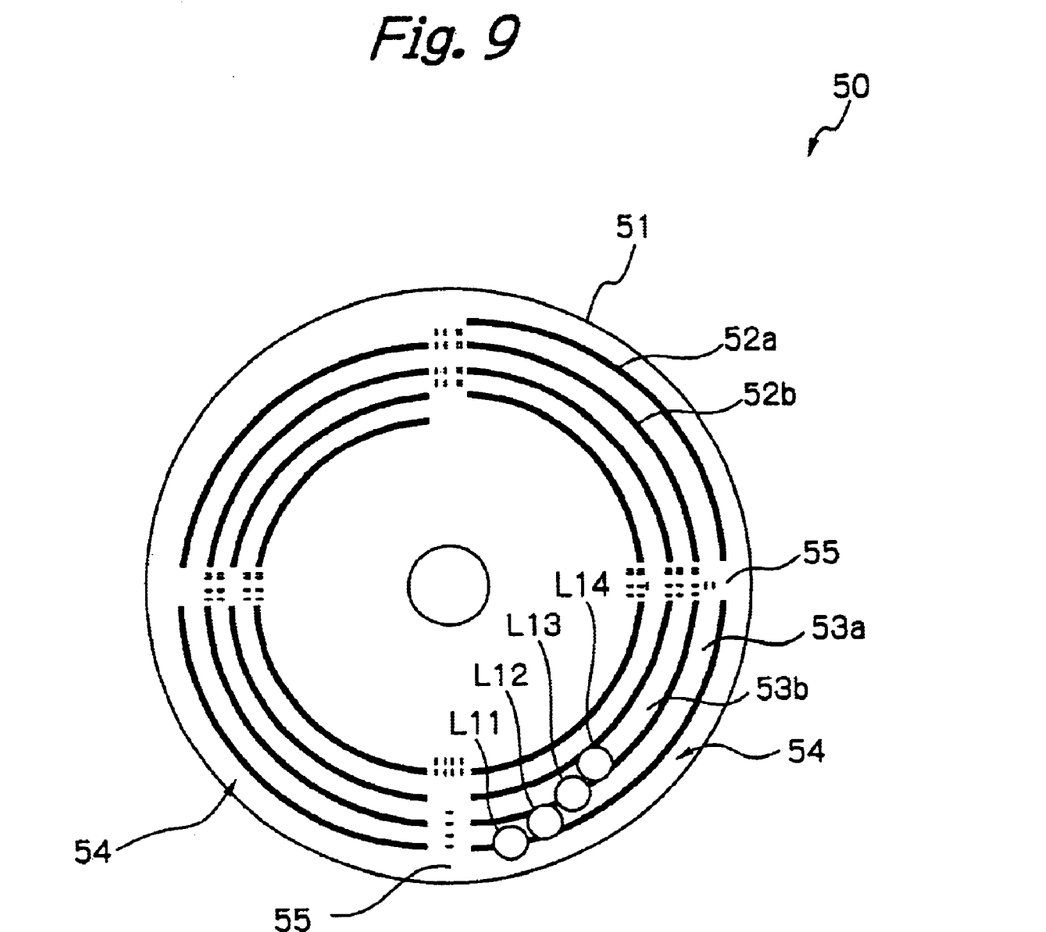
FIG. 9 is a fragmentary enlarged view showing a further alternative embodiment of the present invention.

A further alternative embodiment of the present invention will be described with reference to FIG. 9. As shown, an optical disk 50 has a substrate 51 formed with double-spiral groove tracks 52a and 52b, which form double-spiral land tracks 53a and 53b therebetween. Header information 55 are periodically recorded in the substrate 51 in part of the groove tracks 52a and 52b and part of the land tracks 53a and 53b independently of data sectors 54. Beam spots L11, L12, L13 and L14 are respectively formed on the groove track 52a, land track 53a, groove track 52b and land track 53b sequentially adjoining each other on the substrate 51.

The blank region 54a forms the end portion of each data sector 54 adjoining the header information 56 in the same manner as on the disk 20 shown in FIGS. 4 and 5. The blank region 54a has a length greater than a distance between nearby ones of the beam spots L11 through L14 in the direction of track.

In the illustrative embodiment, the beam spots L11 through L14 record or reproduce data in or out of the associated tracks in the same manner as in the embodiment described with reference to FIGS. 3 through 5. More specifically, when any one of the beam spots, e.g., the beam spot L11 is reproducing the header information 55, the other beam spots L12 through L14 each are positioned in the range of the header information 55 or the blank region 54a of the data sector 54. The beam spots L12 through L14 therefore do not record or reproduce data in or out of the data sector 54. In this manner, the head does not record or reproduce data in or out of the data sector 54 at the same time as it reproduces the header information 55. It follows that the recording/reproducing device does not need any sophisticated control and is therefore simple and low cost.

While the illustrative embodiments have concentrated on an optical disk formed with one or two spiral grooves, the present invention is, of course, practicable with an optical disk having three or more spiral grooves. The crux is that when an optical disk has n spiral grooves, the optical head forms 2n or more beam spots on the disk for recording or reproducing data in or out of groove tracks and land tracks.

In summary, it will be seen that the present invention provides a method and an apparatus for data recording/ reproduction having various unprecedented advantages, as enumerated below.

(1) An exclusive beam spot is formed on each of a land track and a groove track. Such beam spots can record or reproduce data in or out of the land track and groove track at the same time. This makes it needless for a beam spot to jump from one track to another track and thereby simplifies servo control for the tracking of an optical head. In addition, a servo error ascribable to such track jump is fully obviated.

(2) When one beam spot on the land track of the groove track is reading header information, the other beam spot does not record or reproduce data. This obviates the need for sophisticated control over the optical head and thereby reduces cost.

(3) The beam spots are positioned in accordance with the distance between header information in the direction of track. Therefore, when one beam spot is reproducing header information, the other beam spot also faces header information and does not record or reproduce data.

(4) The beam spots are positioned in accordance with the distance between header information in the direction of track. Therefore, when one beam spot is reproducing header information out of the land track or the groove track, the other beam spot also faces and therefore reproduces the header information of the groove track or that of the land track. Consequently, the two beam spots reproduce header information out of the two tracks at the same time, further promoting easy recording or reproduction.

(5) Even when the header information has a length greater than the distance between the beam spots, the header information is divided into segments each having a length smaller than the above distance and arranged in a zigzag configuration. The beam spots can therefore be desirably formed on the header information.

Various modifications will become possible for those skilled in the art after receiving the teachings of the present disclosure without departing from the scope thereof.

What is claimed is:

1. A method of recording or reproducing data out of an optical disk, comprising the steps of:
   preparing the optical disk comprising a substrate formed with a spiral groove track and a spiral land track formed between nearby portions of said groove track, header information being periodically recorded in each of said groove track and said land track;
   forming beam spots on the land track and the groove track at the same time;
   recording or reproducing data in or out of the land track and the groove track at the same time on the basis of a timing determined by the header information read out of said land track and said groove track: and
   inhibiting, when one of the beam spots formed on one of the land track and the groove track is reading the header information, the other beam spot from recording or reproducing data.

2. The method as claimed in claim 1, wherein the land track and groove track for recording or reproducing data adjoin each other, and the header information are shifted in position from each other by a preselected distance in a direction of track.

3. The method as claimed in claim 2, wherein the beam spots formed on the optical disk are spaced from each other in the direction of track.

4. The method as claimed in claim 1, wherein the header information of the land track and the header information of the groove track, which adjoins said land track are shifted in position from each other by a preselected distance in a direction of track so as not to adjoin each other in a radial direction of the optical disk.

5. The method as claimed in claim 4, wherein the beam spots are spaced from each other by the preselected distance between the header information.

6. The method as claimed in claim 1, wherein the groove track comprises n spiral grooves, and one beam spot is formed on each of said n spiral grooves and lands formed between nearby ones of said n grooves.

7. In an apparatus for recording or reproducing data out of an optical disk comprising a substrate formed with a spiral groove track and a spiral land track formed between nearby portions of said groove track with an optical head, header information being periodically recorded in each of said groove track and said land track, said optical head forms beam spots on said land track and said groove track at the same time,
   said head records or reproduces data in or out of the land track and the groove track at the same time on the basis of a timing determined by the header information read out of said land track and said groove track, and
   said head interrupts, when one of the beam spots formed on one of the land track and the groove track is reading the header information, recording or reproducing data with the other beam spot.

8. The apparatus as claimed in claim 7, wherein the land track and groove track for recording or reproducing data adjoin each other, and the header information are shifted in position from each other by a preselected distance in a direction of track.

9. The apparatus as claimed in claim 8, wherein the beam spots formed on the optical disk are spaced from each other in the direction of track.

10. The apparatus as claimed in claim 7, wherein the header information of the land track and the header information of the groove track, which adjoins said land track, are shifted in position from each other by a preselected distance in a direction of track so as not to adjoin each other in a radial direction of the optical disk.

11. The method as claimed in claim 10, wherein the beam spots are spaced from each other by the preselected distance between the header information.

12. The method as claimed in claim 7, wherein the groove track comprises n spiral grooves, and one beam spot is formed on each of said n spiral grooves and lands formed between nearby ones of said n grooves.

* * * * *